United States Patent
Smith (10) Patent No.: US 10,907,631 B2
(45) Date of Patent: Feb. 2, 2021

(54) PUMP RIPPLE PRESSURE MONITORING FOR INCOMPRESSIBLE FLUID SYSTEMS

(71) Applicant: Rolls-Royce Corporation, Indianapolis, IN (US)

(72) Inventor: Alan Smith, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 275 days.

(21) Appl. No.: 16/052,180

(22) Filed: Aug. 1, 2018

(65) Prior Publication Data

US 2020/0040889 A1  Feb. 6, 2020

(51) Int. Cl.
| | |
|---|---|
| F04B 51/00 | (2006.01) |
| F04B 53/20 | (2006.01) |
| F04C 14/28 | (2006.01) |
| G01N 11/00 | (2006.01) |

(52) U.S. Cl.
CPC .............. *F04B 51/00* (2013.01); *F04B 53/20* (2013.01); *F04C 14/28* (2013.01); *G01N 11/00* (2013.01); *F04B 2201/0202* (2013.01); *F04B 2203/0209* (2013.01); *F04B 2205/05* (2013.01); *F04B 2205/09* (2013.01); *F04B 2205/13* (2013.01); *F04C 2270/05* (2013.01); *F04C 2270/18* (2013.01); *F04C 2270/20* (2013.01); *F04C 2270/80* (2013.01)

(58) Field of Classification Search
CPC .......................... F04B 2205/13; F04B 2205/05
See application file for complete search history.

(56) References Cited

U.S. PATENT DOCUMENTS

| | | | | |
|---|---|---|---|---|
| 3,847,507 A | * | 11/1974 | Sakiyama | ............... F04B 49/06 417/22 |
| 4,299,198 A | * | 11/1981 | Woodhull | ................. F03D 7/02 126/247 |
| 4,515,529 A | * | 5/1985 | Woodhull | ................. F03D 9/22 417/63 |
| 4,934,143 A | | 6/1990 | Ezell et al. | |
| 5,046,397 A | | 9/1991 | Ezell et al. | |
| 5,385,329 A | | 1/1995 | Phillips | |

(Continued)

FOREIGN PATENT DOCUMENTS

| | | |
|---|---|---|
| GB | 2386426 | 9/2003 |
| WO | 2017184651 A1 | 10/2017 |

OTHER PUBLICATIONS

D. N. Johnston et al., "Measurement of Positive Displacement Pump Flow Ripple and Impedance", Proceedings of the Institution of Mechanical Engineers, Part I: Journal of Systems and Control Engineering, vol. 210, No. 1, Feb. 1, 1996. (Year: 1996).*

(Continued)

*Primary Examiner* — David A. Rogers
(74) *Attorney, Agent, or Firm* — Brinks Gilson & Lione (57) ABSTRACT

Systems and methods are disclosed of monitoring performance of an incompressible fluid system. The system has a positive displacement pump and a high bandwidth pressure sensor. A method comprises sensing a pressure of the fluid with the pressure sensor, determining pump ripple frequency and hence the speed of the positive displacement pump, calculating the pump flow rate, determining a flow restriction of the fluid system based on the pressure and flow, and assessing or trending the fluid system flow restriction.

20 Claims, 7 Drawing Sheets

(56) References Cited

U.S. PATENT DOCUMENTS

| | | | | |
|---|---|---|---|---|
| 6,116,872 | A * | 9/2000 | Takeshita | F04B 11/0091 417/543 |
| 6,494,685 | B2 * | 12/2002 | Carstensen | F04B 11/00 417/44.1 |
| 2004/0029662 | A1 | 2/2004 | Hearn | |
| 2007/0201989 | A1 * | 8/2007 | Zhu | F04C 15/0049 417/310 |
| 2008/0240932 | A1 * | 10/2008 | Carstensen | F04B 51/00 417/63 |
| 2011/0311386 | A1 * | 12/2011 | Hill | F04C 13/002 418/206.1 |
| 2014/0294601 | A1 * | 10/2014 | O'Shea | B60G 17/00 417/42 |
| 2017/0182859 | A1 | 6/2017 | Anderson et al. | |
| 2019/0162179 | A1 * | 5/2019 | O'Shea | F04B 49/103 |

OTHER PUBLICATIONS

Jian-Jun Shu et al., "Pressure Pulsations in Reciprocating Pump Piping Systems Part 1: Modelling", Proceedings of the Institution of Mechanical Engineers Part I: Journal of Systems and Control Engineering, vol. 211, No. 13, May 1, 1997. (Year: 1997).*

* cited by examiner

PUMP RIPPLE PRESSURE MONITORING FOR INCOMPRESSIBLE FLUID SYSTEMS

BACKGROUND

In incompressible fluid systems it is often desirable to monitor certain parameters of the fluid as an indicator of system performance and health. As but one example, a complex machine such as a gas turbine engine typically includes various oil and cooling systems that are required to ensure proper functioning of the machine and avoid catastrophic damage. For this reason, the performance of the oil and cooling systems is generally monitored using various sensors and measurement devices. Any failure of the oil and cooling systems must be identified and addressed quickly to prevent damage to the machine.

Existing systems for monitoring the full health and performance of an incompressible fluid system such as the oil and cooling systems of a gas turbine engine are typically complex. These monitoring systems often require the use of many sensors that may be disposed at many points in the system, as well as circuitry associated with monitoring and evaluating sensor outputs. Complex monitoring systems are problematic in that they can add to a machine's maintenance requirements, are prone to failure, and may add significant weight to the machine (particularly problematic for implementations such as gas turbine engines used in civil or military aviation applications). It is therefore desirable to provide a system for monitoring the performance of an incompressible fluid system having reduced complexity.

SUMMARY

According to some aspects of the present disclosure, methods are presented of monitoring performance of a fluid system. The incompressible fluid system has a positive displacement pump and a high bandwidth pressure sensor. The method comprises sensing a pressure of the fluid with the high bandwidth pressure sensor; determining from the pressure sensing a ripple frequency of the fluid caused by the pump and hence the speed of the positive displacement pump; calculating from the speed of the positive displacement pump a flow rate of the fluid through the positive displacement pump; determining, based on the calculated flow rate and the sensed pressure, a flow restriction of the fluid system; and assessing the fluid system total effective area flow restriction relative to the expected flow restriction In some embodiments the step of assessing the fluid system for an excessive flow restriction condition using the determined flow restriction comprises comparing the determined flow restriction of the fluid system to a baseline flow restriction; and indicating an excessive flow restriction when the determined flow restriction exceeds the baseline flow restriction by a first predetermined amount. In some embodiments the method further comprises providing an indication to an operator of the fluid system to inspect a filter of the fluid system when the determined flow restriction exceeds the baseline flow restriction by a second predetermined amount.

In some embodiments the step of assessing the fluid system for an excessive flow restriction condition using the determined flow restriction comprises: calculating an average fluid pressure over a period of time based on the sensed fluid pressures; comparing the calculated average fluid pressure to a fluid pressure sensed at a specific time; and indicating an excessive flow restriction when the fluid pressure sensed at a specific time deviates from the calculated average fluid pressure by greater than a threshold magnitude.

In some embodiments the method further comprises developing a pressure trendline from the sensed pressures collected in the step of sensing a pressure of the fluid with the pressure sensor; and evaluating the pressure trendline to determine a degree of flow restriction in the fluid system. In some embodiments the method further comprises evaluating the pressure trendline to determine whether the positive displacement pump has failed.

In some embodiments said positive displacement pump is coupled to a rotatable prime mover. The method further comprises determining, from the speed of the positive displacement pump, the speed of the rotatable prime mover. In some embodiments the method further comprises comparing the speed of the rotatable prime mover to an output of another sensor that measures the speed of the rotatable prime mover. In some embodiments the pressure sensor is disposed at a discharge of the positive displacement pump.

According to further aspects of the present disclosure, a method is presented of monitoring the performance of an incompressible fluid system using a single sensor disposed in the fluid system. The fluid system comprises a positive displacement pump coupled to fluid conduit and driven by a prime mover. The single sensor comprises a pressure sensor for sensing the pressure of a fluid passing through the fluid conduit. The method comprises sensing a pressure of the fluid with the pressure sensor for a period of time; determining from the pressure sensing a ripple frequency of the fluid and a speed of the positive displacement pump; checking, using the ripple frequency of the fluid, for failure of a pump driver coupling the positive displacement pump to the prime mover; deriving the speed of the prime mover from the speed of the positive displacement pump and comparing the derived speed to a measured speed of the prime mover; and evaluating the fluid system for an excessive flow restriction condition by: calculating from the speed of the positive displacement pump a flow rate of the fluid induced by the positive displacement pump; determining, based on the calculated flow rate and the sensed pressure, a flow restriction of the fluid system; comparing the determined flow restriction of the fluid system to a baseline flow restriction; and indicating an excessive flow restriction when the determined flow restriction exceeds the baseline flow restriction by a first predetermined amount.

In some embodiments the baseline flow restriction is a calculated average flow restriction over a period of time. In some embodiments the method further comprises providing an indication to an operator of the fluid system to inspect a filter of the fluid system when the determined flow restriction exceeds the baseline flow restriction by a second predetermined amount.

In some embodiments the method further comprises developing a pressure trendline from the sensed fluid pressures collected in the step of sensing a pressure of the fluid system with the pressure sensor; and evaluating the pressure trendline to determine a degree of flow restriction in the fluid system.

In some embodiments the method further comprises developing a pressure trendline from the sensed fluid pressures collected in the step of sensing a pressure of the fluid system with the pressure sensor; and evaluating the pressure trendline to determine leakage of the positive displacement pump.

In some embodiments the method further comprises creating first logged data comprising sensed pressure, ripple frequency, speed of the positive displacement pump, and flow rate determined for a first time; creating second logged data comprising sensed pressure, ripple frequency, speed of the positive displacement pump, and flow rate determined for a second time; comparing said second logged data to said first logged data to determine leakage of the positive displacement pump. In some embodiments the method further comprises evaluating the fluid system for resonances based on flow ripple.

According to yet further aspects of the present disclosure, a method is presented of monitoring deterioration of the positive displacement pump. The pump is in an incompressible fluid system having a pressure sensor positioned to sense the pressure of fluid exiting the positive displacement pump. The method comprises sensing a pressure of the fluid with the pressure sensor at a first time; determining from the sensed pressure a ripple frequency of the fluid and speed of the positive displacement pump at the first time; calculating from the speed of the positive displacement pump a flow rate of the fluid at the first time; creating first logged data by saving to a memory the sensed pressure, ripple frequency, speed of the positive displacement pump, and flow rate determined at the first time; repeating the steps of sensing pressure, determining ripple frequency and speed of the positive displacement pump, and calculating flow rate for a second time; creating second logged data by saving to a memory the sensed pressure, ripple frequency, speed of the positive displacement pump, and flow rate determined at the second time; and comparing said second logged data to said first logged data to determine leakage of the positive displacement pump.

In some embodiments the method further comprises developing a pressure trendline from the sensed pressures of the first and second logged data; and evaluating the pressure trendline to determine a degree of flow restriction in the fluid system. In some embodiments the method further comprises evaluating the pressure trendline to determine whether the positive displacement pump has failed. In some embodiments the method further comprises providing an indication to an operator of the fluid system when the determined leakage of the positive displacement pump exceeds a predetermined amount.

BRIEF DESCRIPTION OF THE DRAWINGS

The following will be apparent from elements of the figures, which are provided for illustrative purposes.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments in the drawings and specific language will be used to describe the same.

The present disclosure is directed to a system for addressing the aforementioned deficiencies in the art of monitoring performance in incompressible fluid systems, namely the use of complex and cumbersome monitoring systems. The present disclosure provides a single-sensor monitoring system and associated methods that enable the evaluation of myriad performance parameters and metrics. A high bandwidth pressure sensor senses the pressure of the fluid in the incompressible fluid system, and a ripple frequency is derived from fluctuations in the sensed pressure. Using the sensed pressure and ripple frequency a full accounting of the health and performance of the fluid system may be conducted.

Figure 1:
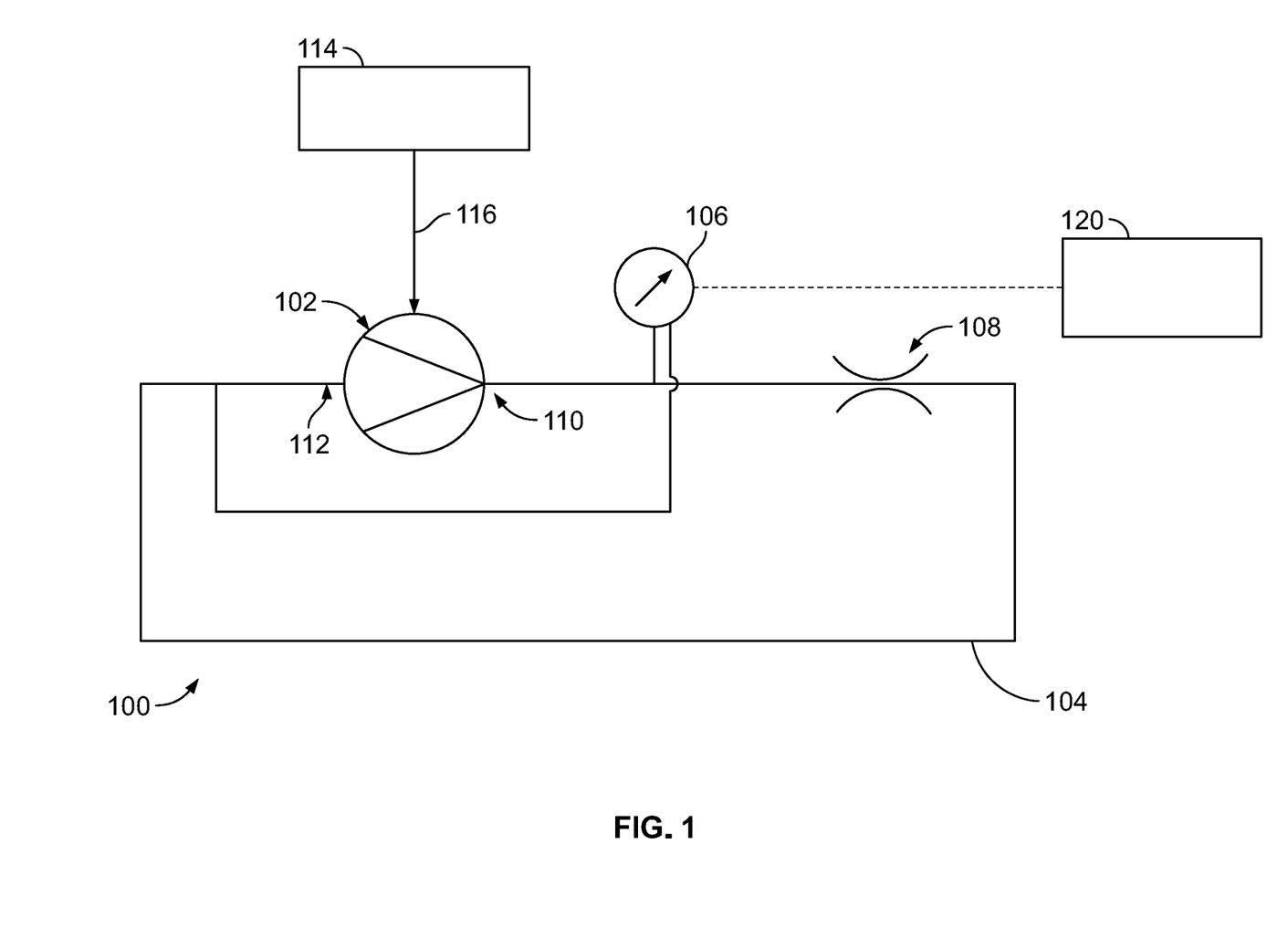
FIG. 1 is a simplified schematic diagram of an incompressible fluid system in accordance with some embodiments of the present disclosure.

FIG. 1 is a simplified schematic diagram of an incompressible fluid system 100 in accordance with some embodiments of the present disclosure. Although presented here in simplified form, it is to be understood that the fluid system 100 of FIG. 1 may be more complex and include a wide variety of additional components such as valves, filters, conduit, and the like. One example of a more complex fluid system is an oil system of a gas turbine engine.

As shown in FIG. 1, the fluid system 100 comprises a positive displacement pump 102, fluid conduit 104, pressure sensor 106, and orifice 108. The fluid conduit 104 conveys fluid from a discharge 110 of the positive displacement pump 102 past the pressure sensor 106, through the orifice 108, and to a supply 112 of the positive displacement pump 102.

The positive displacement pump 102 may be, for example, a gear pump, a G-rotor pump, piston pump, or a vane pump. The positive displacement pump 102 may be driven by a prime mover 114, and may be coupled to the prime mover 114 via prime driver 116 such as a shaft and/or gearbox. The prime mover 114 may be the rotatable shaft of a turbine engine.

The pressure sensor 106 is in fluid communication with the fluid passing through the fluid conduit 104 is a high bandwidth pressure sensor, capable of measuring the maximum pump pressure ripple frequency. The pressure sensor 106 senses pressure of the fluid, and may send signals representing the sensed pressure to a controller 120 (as indicated by the dashed line between pressure sensor 106 and controller 120). In some embodiments the pressure sensor 106 may be disposed at the discharge 110 of the positive displacement pump 102. The pressure sensor 106 may sense the differential pressure across the pump 102. In some embodiments the pressure sensor 106 may sense an absolute or gauge pressure sensor if the pressure at the pump inlet 112 is known or referenced to atmospheric pressure or where the fluid is discharged to a known gauge or absolute pressure.

Orifice 108 is a simplified representation of all elements in fluid system 100 that restrict the flow of the fluid conveyed therein. Orifice 108 is therefore used to represent additional, non-illustrated elements of the system such as orifices, jets, filters, valves, conduit angles, hydraulic motors, and other restrictions.

From the simplified schematic diagram of FIG. 1, several methods are presented for monitoring the performance of fluid system 100. As indicated above, in critical systems such as the oil or cooling system of a gas turbine engine, it is essential that indications of degraded or failing system performance be remedied promptly to avoid degraded engine performance or damage.

Using the various methods disclosed herein, the output of a single sensor may be used to monitor at least the following parameters in order to evaluate performance of the fluid system: fluid pressure, fluid ripple frequency, positive displacement pump speed, fluid flow rate, flow restriction of the fluid system, average flow restriction for a period of time, average fluid pressure for a period of time, and prime mover speed. From these parameters, at least the following conditions of the fluid system may be determined: failure of the driver of the positive displacement pump; failure of the positive displacement pump; leakage of the positive displacement pump; excessive flow restriction; degree of flow restriction; and failure, miscalibration, or error of a speed sensor of the prime mover.

Figure 2:
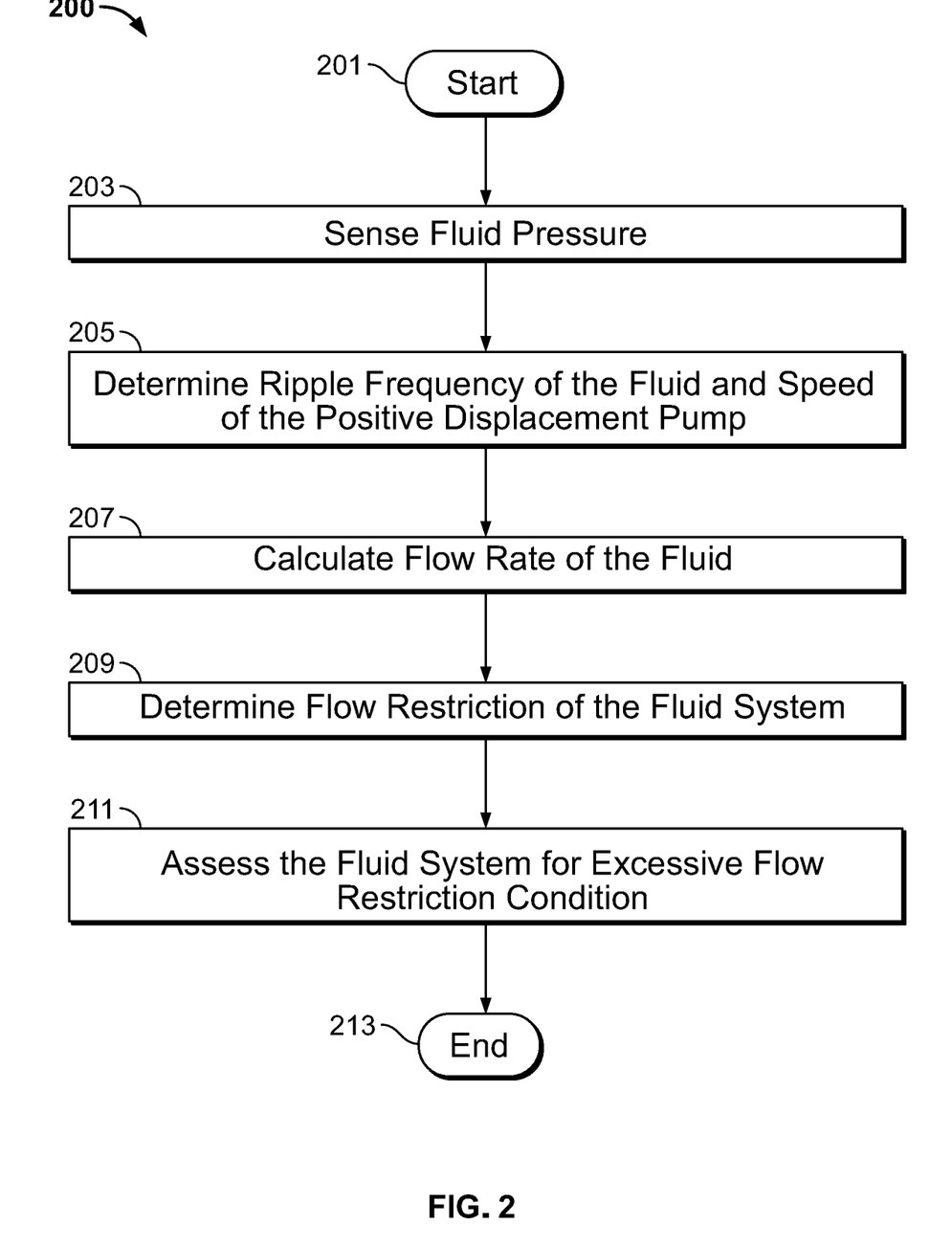
FIG. 2 is a flow diagram of a method in accordance with some embodiments of the present disclosure.

A method 200 of monitoring performance of a fluid system is described with reference the flow diagram presented in FIG. 2. Method 200 begins at Block 201.

At Block 203 the pressure of the fluid in a fluid system 100 may be sensed via a pressure sensor 106. The pressure sensor 106 senses fluid pressure. The pressure sensor 106 may be disposed in the discharge 110 of a positive displacement pump 102. In some embodiments the pressure sensor 106 may sense the differential pressure across the pump 102.

From the sensed fluid pressure, a ripple frequency of the fluid and speed of the positive displacement pump 102 may be determined at Block 205. The sensed fluid pressure is used to determine the flow ripple of the fluid. Flow ripple is the variation in flow rate from the discharge 110 of the positive displacement pump 102 over time. Flow ripple may be presented as the profile of flow ripple 550 in FIG. 5.

From the flow ripple, a ripple frequency may be determined. The ripple frequency is the number of cycles of the positive displacement pump 102 per unit of time (e.g. cycles per second). As used herein the cycle of a positive displacement pump 102 refers to the movement of incompressible fluid to the discharge 110 by means of the stroke of a piston, rotation of a pair of gear teeth (gear tooth passing), rotation of a single vane, or similar motion, depending on the type of positive displacement pump 102 in the fluid system 100.

The ripple frequency is proportional to the speed of the positive displacement pump 102, such that the speed of the positive displacement pump is also determined at Block 205. In a typical positive displacement pump, the ripple frequency (e.g. cycles per second) divided by the number of pistons, gear teeth, or vanes per pump revolution (e.g. cycles per revolution) will provide the pump speed (e.g. revolutions per second).

At Block 207 the flow rate of the fluid may be calculated. In an incompressible fluid system, the speed of a positive displacement pump 102 is proportional to the flow rate because each cycle of the pump displaces a consistent volume of fluid and thus induces a known flow rate. The volume of fluid displaced per pump cycle is a pump capacity that may be measured, for example, in cubic inches per revolution or cubic gallons per revolution. Thus multiplying the pump speed (revolutions per second) with the pump capacity (volume per revolution) will provide flow rate (volume per second).

At Block 209 the flow restriction of the fluid system 100 may be determined. As discussed above with reference to FIG. 1, all restrictions of the fluid system 100 may be conceptually modeled as a single orifice 108. In an incompressible fluid system, the relationship Equation (A) below is used to evaluate the area of the orifice 108 (i.e. the effective area available for flow in the flow conduit 104.

$$q = CA\sqrt{\frac{2\Delta P}{\rho}} \qquad (A)$$

For a constant flow rate (q), changes in pressure of the incompressible fluid are indicative of changes in the area A of the orifice 108. By comparing the calculated area A against a baseline area or average area from a previous time period, a flow restriction is determined. The flow restriction is the reduction in available flow area through the orifice 108.

At Block 211, the fluid system 100 is assessed for an excessive flow restriction condition. If an excessive flow restriction condition is assessed, an indication may be provided to an operator of the fluid system 100. The indication may indicate to the operator that a filter of the fluid system 100 requires inspection.

The assessment for an excessive flow restriction condition may take several forms. In some embodiments, the determined flow restriction from Block 209 is compared against a baseline flow restriction. The baseline flow restriction may be established as a calculated, theoretical, or measured value. For example, testing may be performed on a fluid system 100 to establish a baseline flow restriction, and that baseline may be used for future comparison to evaluate for excessive flow restriction conditions. The baseline flow restriction may further be a calculated average flow restriction based on the determined flow restrictions of Block 209 collected for a period of time.

When comparing the determined flow restriction of Block 209 to a baseline flow restriction, an excessive flow restriction condition may be assessed and/or indicated when the determined flow restriction exceeds the baseline flow restriction by a first predetermined amount. In some embodiments, an excessive flow restriction condition may be assessed when the determined flow restriction exceeds the baseline flow restriction by a first predetermined amount, and an excessive flow restriction condition may be indicated to an operator when the determined flow restriction exceeds the baseline flow restriction by a second predetermined amount.

In some embodiments the determined flow restriction from Block 209 is compared against a baseline flow restriction that is an average of the determined flow restrictions collected for a period of time. An excessive flow restriction condition may be assessed and/or indicated when a determined flow restriction at a specific time deviates from the calculated average determined flow restriction by greater than a threshold magnitude.

In some embodiments, the step of assessing the fluid system 100 for an excessive flow restriction condition comprises comparing a sensed fluid pressure at a specific time to a calculated average fluid pressure. The average fluid pressure may be calculated for a given period of time based on the collection of fluid pressures sensed in Block 203 or plotted at Block 205. A sensed fluid pressure at a specific time may then be compared to the calculated average fluid pressure, and an excessive fluid restriction condition may be assessed and/or indicated when the sensed fluid pressure at a specific time deviates from the calculated average fluid pressure by greater than a threshold magnitude.

Figure 5:
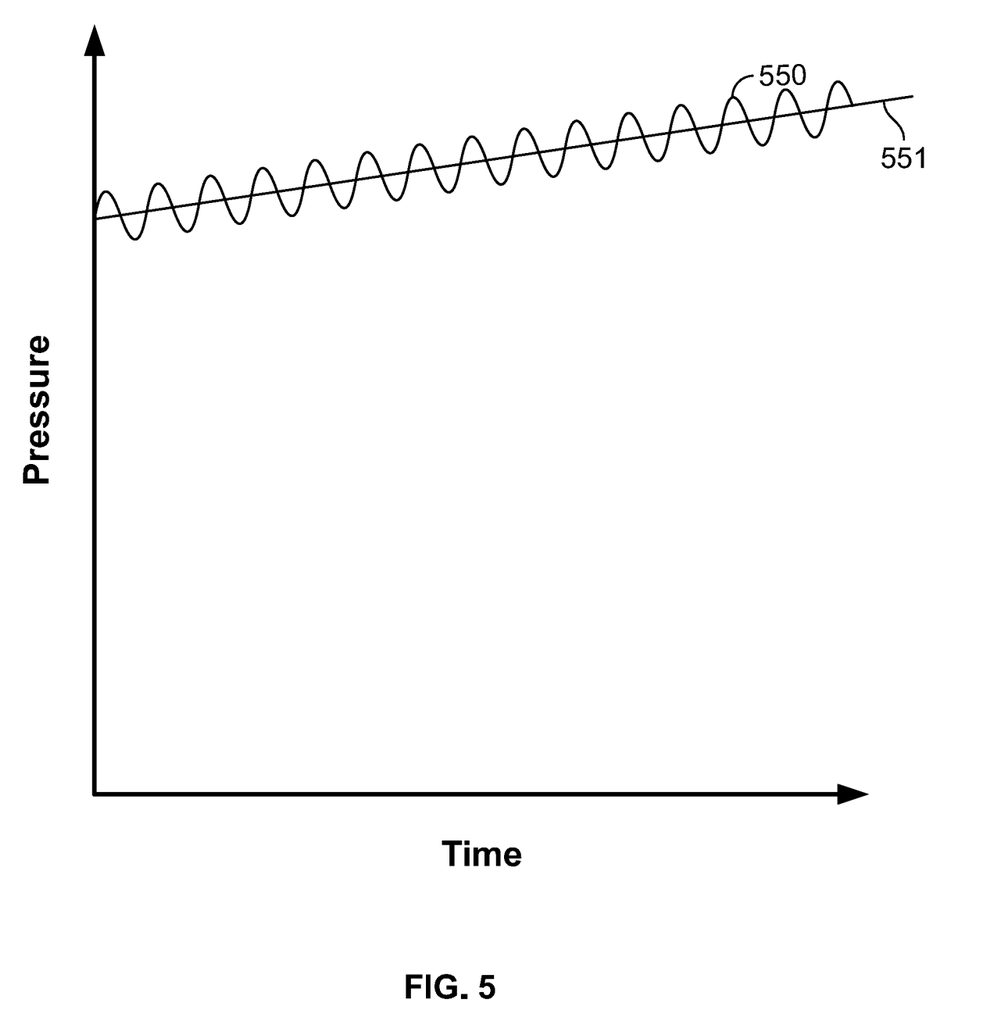
FIG. 5 is a graph of sensed pressure over time, illustrating a pump ripple in accordance with some embodiments of the present disclosure.
Figure 6:
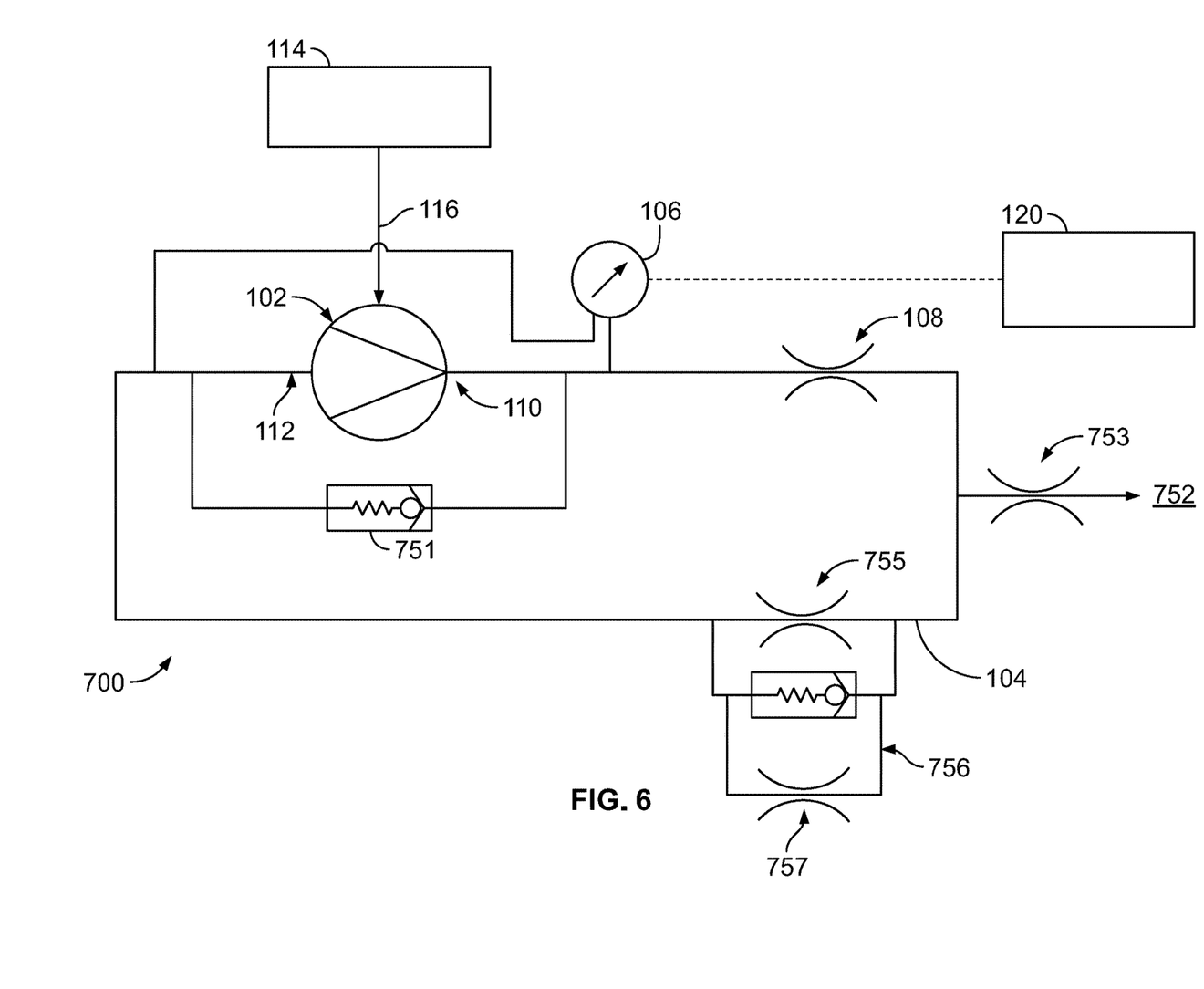
FIG. 6 is a simplified schematic diagram of an incompressible fluid system in accordance with some embodiments of the present disclosure.

In some embodiments method 200 further comprises an evaluation of pressure trends to determine a degree of flow restriction or blockage in the fluid system 100. A pressure trendline may be developed from the sensed fluid pressures of Block 203 or the flow ripple of Block 205. An example of such a trendline 551 is illustrated at FIG. 5. In place of developing a pressure trendline, trends in sensed fluid pressures may be monitored, calculated, or otherwise evaluated.

The developed pressure trendline may then be evaluated to determine a degree of restriction or blockage in the fluid system 100. For example, as described above with respect to Block 209, steadily increasing fluid pressures for a constant flow rate indicates an increasing flow restriction. The degree of restriction may be determined by comparison to a baseline flow restriction. As with baseline flow restrictions described above, the baseline flow restriction may be established as a calculated, theoretical, or measured value to include a calculated average flow restriction for a period of time.

In some embodiments method 200 further comprises evaluating the pressure trendline or trends in sensed fluid pressure described above to determine whether the positive displacement pump 102 has failed. Trends indicating a steep decline in sensed fluid pressure may indicate the failure of the positive displacement pump 102. Although there are many failure modes of a positive displacement pump 102, a sensed fluid pressure rapidly approaching zero may indicate, in appropriate embodiments, a failure of the prime mover 114 and/or shaft 116 or gearbox coupling the prime mover 114 to the positive displacement pump 102.

In embodiments having a positive displacement pump 102 coupled to a prime mover 114 via a shaft 116 or gearbox, method 200 may further comprise determining the speed of the prime mover 114. When coupled through a gearbox, the speed of the positive displacement pump 102 determined at Block 205 is proportional to the speed of the prime mover 114 as determined by the gear ratio. Thus the speed of the positive displacement pump 102 determined at Block 205 may be converted to the speed of the prime mover 114.

In some embodiments this determined speed of the prime mover 114 may be used to verify the accuracy of one or more additional sensors assigned to specifically monitor the speed of the prime mover 114. For example, the determined speed of the prime mover 114 may be compared to the speed sensed by another sensor to evaluate the accuracy of the other sensor. An indication may be provided to an operator if the determined speed of the prime mover 114 deviates sufficiently from the sensed speed.

Method 200 ends at Block 213.

Figure 3:
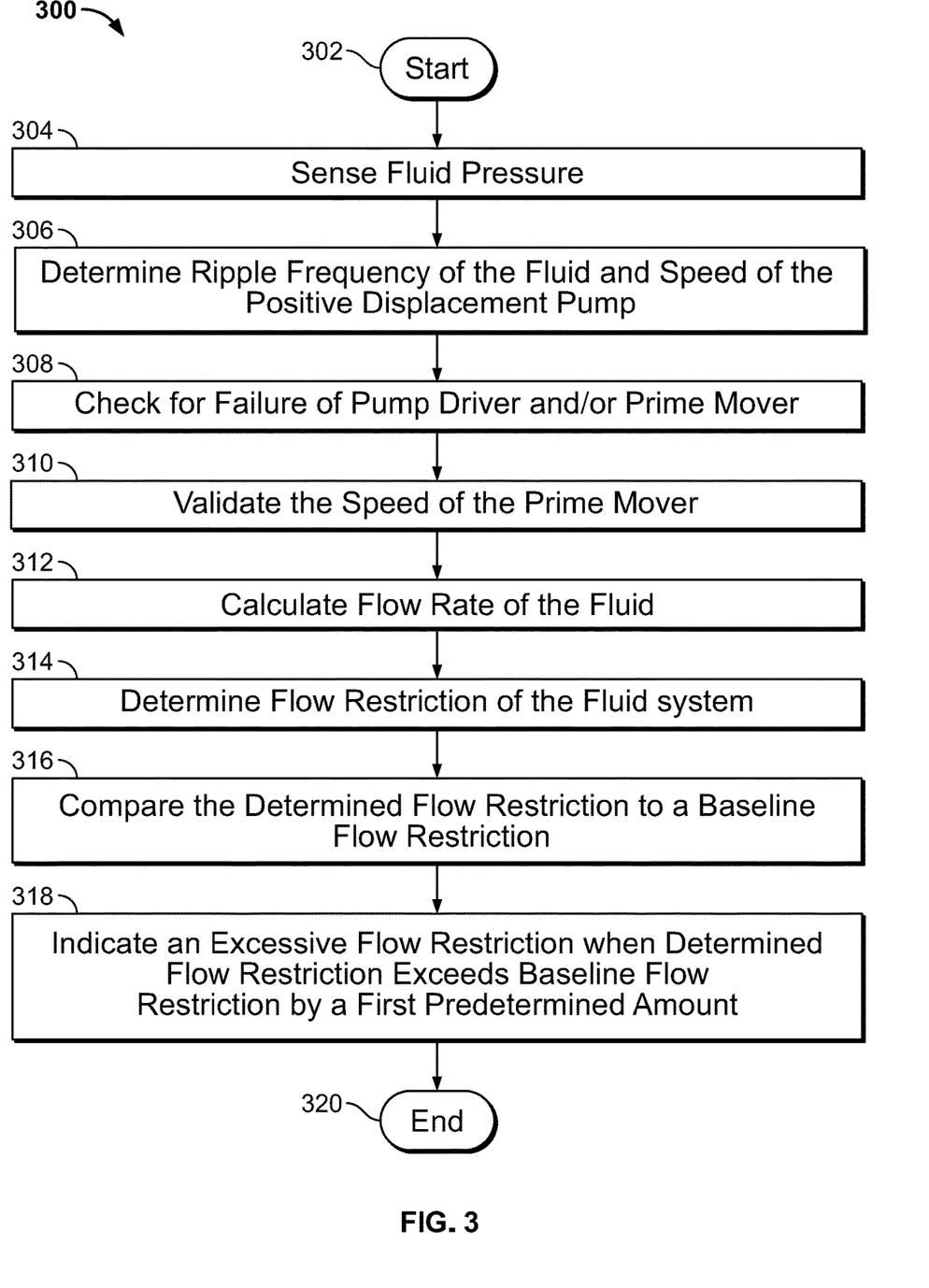
FIG. 3 is a flow diagram of a method in accordance with some embodiments of the present disclosure.

A method 300 of monitoring the performance of an incompressible fluid system 100 is presented in the flow diagram of FIG. 3. The fluid system 100 may be substantially as described above with respect to FIG. 1, and may comprise a positive displacement pump 102 coupled to a fluid conduit 104 and driven by a prime mover 114. A single sensor of the system 100 may comprise a pressure sensor 106. The pressure sensor 106 may be in fluid communication with fluid in the fluid system 100, and may be disposed in the discharge 110 of the positive displacement pump 102.

Method 300 starts at Block 302. At Block 304, fluid pressure of the system may be sensed using pressure sensor 106, as described above with reference to Block 203 of method 200. At Block 306, a ripple frequency of the fluid and speed of the positive displacement pump 102 may be determined, as described above with reference to Block 205 of method 200.

At Block 308, a check is performed to evaluate for failure of the positive displacement pump 102. For example, the ripple frequency of the fluid determined at Block 306 may give an indication of failure of the positive displacement pump 102 when the pressure and ripple frequency rapidly declines and/or approaches zero. Similarly, the speed of the positive displacement pump 102 derived from the ripple frequency may rapidly decline and/or approach zero to indicate failure of the positive displacement pump 102. Although there are many failure modes of a positive displacement pump 102, one example of such a failure is the failure of the prime mover 114 and/or shaft 116 or gearbox coupling the prime mover 114 to the positive displacement pump 102.

In some embodiments, the check performed at Block 308 may begin by developing a pressure trendline from the sensed fluid pressures of Block 302 or the flow ripple of Block 304. An example of such a trendline is illustrated at FIG. 5. In place of developing a pressure trendline, trends in sensed fluid pressures may be monitored, calculated, or otherwise evaluated. The pressure trendline or trends in sensed fluid pressure may be used to determine whether the positive displacement pump 102 has failed. Trends indicating a steep decline in sensed fluid pressure may indicate the failure of the positive displacement pump 102.

At Block 310 the speed of the prime mover 114 may be validated. In embodiments having a positive displacement pump 102 coupled to a prime mover 114 via a shaft 116 or gearbox, method 300 may comprise determining the speed of the prime mover 114. When coupled through a gearbox, the speed of the positive displacement pump 102 determined at Block 306 is proportional to the speed of the prime mover 114 as determined by the gear ratio. Thus the speed of the positive displacement pump 102 determined at Block 306 may be converted to the speed of the prime mover 114. In some embodiments this determined speed of the prime mover 114 may be used to verify the accuracy of one or more additional sensors assigned to specifically monitor the speed of the prime mover 114. For example, the determined speed of the prime mover 114 may be compared to the speed sensed by another sensor to evaluate the accuracy of the other sensor. An indication may be provided to an operator if the determined speed of the prime mover 114 deviates sufficiently from the sensed speed.

Blocks 312 through 316 indicate a process for evaluating the fluid system 100 for an excessive flow restriction. At Block 312 a flow rate of the fluid is calculated as described above with reference to Block 207 of method 200. At Block 314 a flow restriction of the fluid system 100 is determined as described above with reference to Block 209 of method 200.

At Block 316 the determined flow restriction from Block 314 is compared to a baseline flow restriction. The baseline flow restriction may be established as a calculated, theoretical, or measured value. For example, testing may be performed on a fluid system 100 to establish a baseline flow restriction, and that baseline may be used for future comparison to evaluate for excessive flow restriction conditions. The baseline flow restriction may further be a calculated average flow restriction based on the determined flow restrictions of Block 314 collected for a period of time.

In some embodiments the determined flow restriction from Block 314 is compared against a baseline flow restriction that is an average of the determined flow restrictions collected for a period of time. An excessive flow restriction condition may be assessed when a determined flow restriction at a specific time deviates from the calculated average determined flow restriction by greater than a threshold magnitude.

At Block 318, if an excessive flow restriction condition is assessed, an indication may be provided to an operator of the fluid system 100. The indication may indicate to the operator that a filter of the fluid system 100 requires inspection. In some embodiments an excessive flow restriction condition may be assessed and/or indicated when the determined flow restriction exceeds the baseline flow restriction by a first predetermined amount. In some embodiments an excessive flow restriction condition may be assessed when the determined flow restriction exceeds the baseline flow restriction by a first predetermined amount, and an excessive flow restriction condition may be indicated to an operator when the determined flow restriction exceeds the baseline flow restriction by a second predetermined amount.

In some embodiments method 300 further comprises an evaluation of pressure trends to determine a degree of flow restriction or blockage in the fluid system 100, as described above with reference to method 200.

In some embodiments method 300 further comprises evaluating pressure trends to determine leakage of the positive displacement pump 102. As positive displacement pumps wear with age, leakage is a common problem. Leakage of a positive displacement pump causes the pump to operate at less than the pump capacity. From Equation (A) above, it is seen that for a known or substantially constant flow restriction A, changes in fluid pressure are indicative of reduced flow rate. This flow rate reduction may be attributed to deterioration of the positive displacement pump 102, resulting in leakage. Thus in some embodiments a pressure trendline may be established, or pressure trends may be evaluated, to determine the leakage of the positive displacement pump 102.

In some embodiments, logged data is created to store the various sensed and determined parameters for comparison against additional logged data. For example, a first set of logged data may comprise sensed fluid pressure, ripple frequency, speed of the positive displacement pump, and flow rate as sensed and determined at a first time. A second set of logged data may comprise sensed fluid pressure, ripple frequency, speed of the positive displacement pump, and flow rate as sensed and determined at a second time. Comparisons of first logged data and second logged data may provide insights regarding changes and/or trends in system performance. Although discussed herein as first logged data and second logged data, data may be logged for a nearly infinite number of points in time to create a comprehensive log of parameter data for analysis purposes.

In some embodiments, first logged data is compared to second logged data to evaluate for leakage of the positive displacement pump 102. As described above, for a known or substantially constant flow restriction A, changes in fluid pressure are indicative of reduced flow rate. This flow rate reduction may be attributed to deterioration of the positive displacement pump 102, resulting in leakage. Thus a comparison of first and second logged data may provide an indication of leakage of the positive displacement pump 102, and may also provide a magnitude of such leakage.

In some embodiments method 300 further comprises evaluating the flow ripple for resonances. Resonances in fluid systems can cause system noise and/or damage. The flow ripple of FIG. 5 will show resonances as extreme variances in pressure oscillation amplitude over time that may be associated with certain speeds of the positive displacement pump 102.

Trending can be performed using similar operating points throughout a mission cycle or for different mission cycles by observing the average pressure for a given pump ripple frequency to understand long term trends, such as gradual changes in the flow effective area restrictions, filter blocking, pump leakage deterioration, or deteriorating internal or external leaks in the flow circuit.

Figure 7:
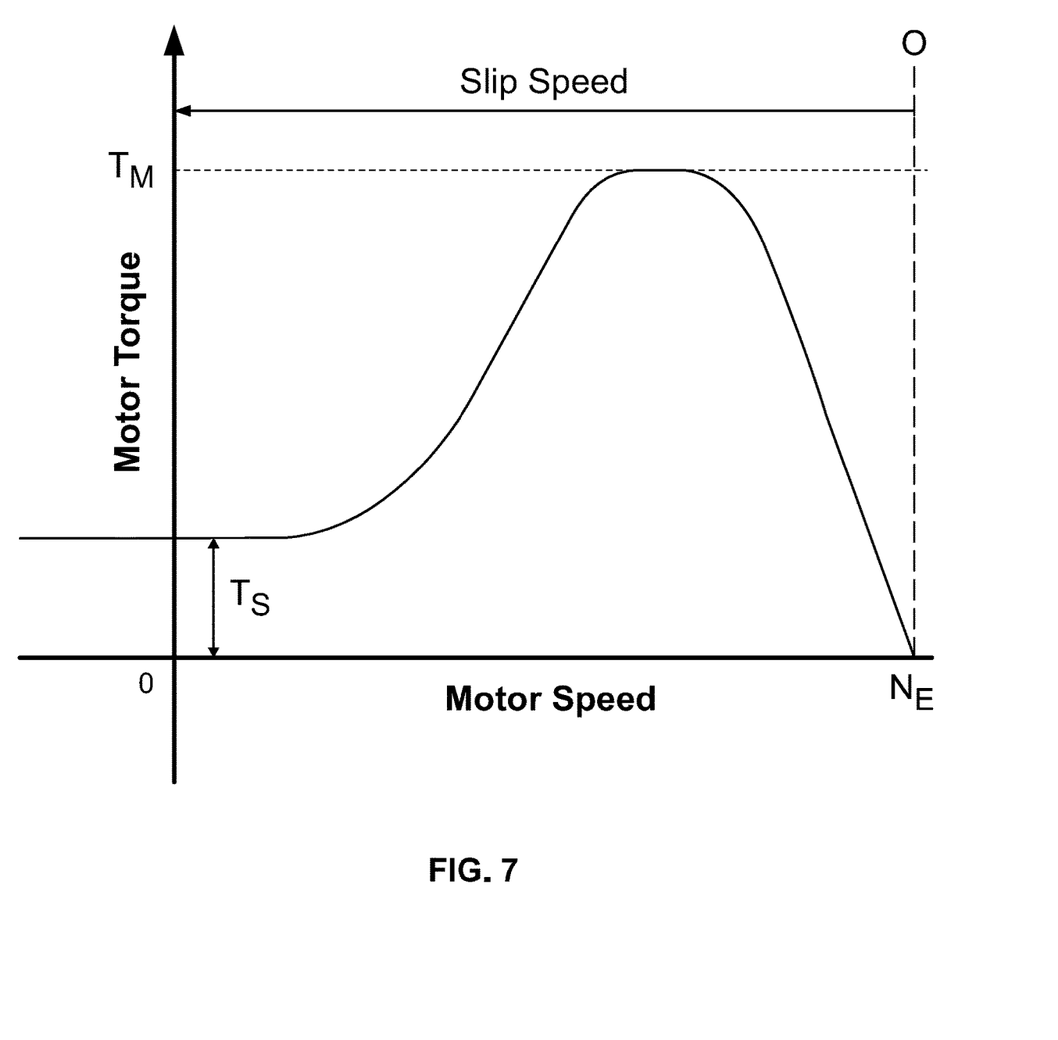
FIG. 7 is a slip speed curve for an induction motor.

Method 300 may be used to assess whether the positive displacement pump has gone into pump bypass due to excessive pressures or a failure of the bypass or pressure relief valve, which will cause the pressure to drop relative to the typical circuit pressure for a given pump flow rate. For example, FIG. 7 presents a simplified schematic diagram of an incompressible fluid system 700 in accordance with some embodiments of the present disclosure. The system 700 includes a pump bypass valve 751 configured to bypass the pump 102 when open. System 700 additionally includes a representation of external leakage 752 through a leakage orifice 753. System 700 also includes a bypass or pressure relief valve 754, with a representation of internal leakage 756 past the bypass or pressure relief valve 754 through the internal leakage orifice 757.

Evaluating a pressure drop relative to the typically circuit pressure for a given pump flow rate can be used to confirm that a bypass valve 751 opens at its design pressure setpoint by comparing the pump flow and pressure against the expected pressure of the system 700 with no flow bypass. Pump bypass typically occurs very quickly and can easily be differentiated relative to long term pump deterioration or slow increases in the pump restrictions due to flow passage or filter blocking. Depending on the time response of the bypass valve 751 relative to the pump ripple frequency, the action of the bypass valve 751 may change the shape of the ripple waveform providing further confirmation of the state of the bypass valve 751.

Method 300 may be further used to evaluate increases in internal fluid leaks from the high pressure to low pressure side of hydraulic flow circuits that can occur due to leaking dynamic seals that would increase the flow circuit effective area restriction Further, method 300 may be used to determine if there is an external fluid leak in the system downstream of the pump that would allow more pump flow that does not pass through the circuit flow restriction. This would have the effect to reduce the average pressure at a given ripple frequency and flow based on the standard flow restriction equation for the flow circuit.

Method 300 ends at Block 320.

Figure 4:
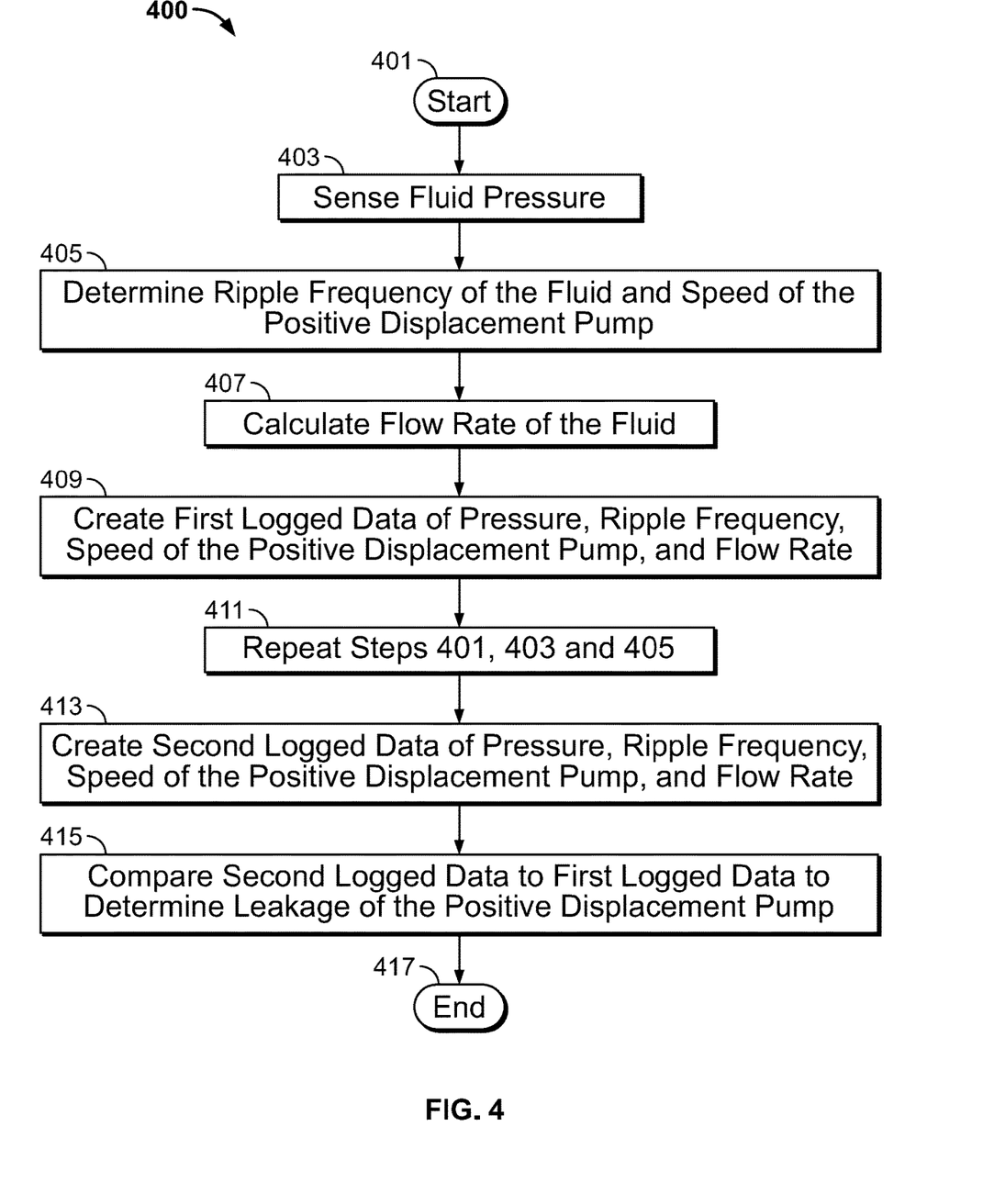
FIG. 4 is a flow diagram of a method in accordance with some embodiments of the present disclosure.

A method 400 of monitoring the deterioration of a positive displacement pump 102 in a incompressible fluid system 100 is presented in the flow diagram of FIG. 4. The fluid system 100 may be substantially as described above with respect to FIG. 1, and may comprise a positive displacement pump 102 coupled to a fluid conduit 104 and driven by a prime mover 114. A single sensor of the system 100 may comprise a high bandwidth pressure sensor 106. The pressure sensor 106 may be in fluid communication with fluid in the fluid system 100, and may be disposed in the discharge 110 of the positive displacement pump 102. The pressure sensor 106 may also be positioned at any location in the flow circuit where it can measure the pump ripple.

Method 400 starts at Block 401. At Block 403, fluid pressure of the system may be sensed using pressure sensor 106, as described above with reference to Block 203 of method 200. At Block 405, a ripple frequency of the fluid and speed of the positive displacement pump 102 may be determined, as described above with reference to Block 205 of method 200. At Block 407, a flow rate of the fluid is calculated as described above with reference to Block 207 of method 200.

At Block 409, first logged data may be created by saving various parameter values to a memory. The parameter values may be sensed or determined at a first time. The parameters may include sensed fluid pressure, ripple frequency, speed of the positive displacement pump, and flow rate. The parameter values may further include any other parameter discussed herein.

The steps of Blocks 401, 403, and 405 are repeated at Block 411 to generate additional parameter values at a second time. At Block 413, second logged data may be created by saving parameter values to memory. The parameter values may be sensed or determined at a second time. The parameters may include sensed fluid pressure, ripple frequency, speed of the positive displacement pump, and flow rate, or any other parameter discussed herein.

At Block 415, first logged data and second logged data are compared to determine leakage of the positive displacement pump 102. As described above and with reference to Equation (A), for a known or substantially constant flow restriction, changes in fluid pressure are indicative of reduced flow rate. This flow rate reduction may be attributed to deterioration of the positive displacement pump 102, resulting in leakage. Thus a comparison of first and second logged data may provide an indication of leakage of the positive displacement pump 102, and may also provide a magnitude of such leakage. The magnitude of leakage may be tracked over time to evaluate the deterioration of a pump condition, and to determine if and when appropriate maintenance should be performed.

Method 400 ends at Block 417.

In embodiments of fluid system 100 having an induction motor driven positive displacement pump 102, each of methods 200, 300, and 400 may further comprise evaluating performance of the pump by determining motor slip speed. The speed of an induction motor is slower than the motor electrical excitation frequency as a function of torque loading, see FIG. 7. The measured pressure ripple frequency is proportional to the output speed of the pump. Thus pressure ripple frequency may be used to determine the speed of the pump and hence speed of the motor (as described above with reference to Block 205 of method 200), The motor speed may then be compared to the motor electrical excitation frequency. The difference between motor speed and speed based on the motor input excitation frequency speed is the motor slip speed. Motor slip speed can be compared to predicted motor torque loading using a curve similar to that shown in FIG. 7 to determine the performance of the pump, health of the pump, and/or need for pump maintenance.

In embodiments of fluid system 100 having an electrically-driven positive displacement pump 102, any determination of flow rate may account for pump droop caused by significant flow restrictions. A significant or excessive flow restriction may cause a drop in pump speed due to the extra loading; this speed drop results in a reduced flow rate which cannot be determined based on the magnitude of the pressure drop alone, and may therefore need to be compensated for or considered in any determination of flow rate.

The steps of the aforementioned methods 200, 300, and 400 that require calculating, determining, comparing, evaluating, creating, storing, or any similar function may be performed in the controller 120. Fluid pressure may be sensed by the pressure sensor 106, and fluid pressure data may be communicated to the controller 120 at a sufficient frequency to allow for the development of a pressure profile that shows flow ripple.

The present disclosure provides numerous advantages over prior art systems and methods of monitoring the performance of an incompressible fluid system. The present disclosure allows for the use of a single pressure sensor to develop numerous performance indicators such as fluid pressure, fluid ripple frequency, positive displacement pump speed, fluid flow rate, flow restriction of the fluid system, average flow restriction for a period of time, average fluid pressure for a period of time, and prime mover speed. The circuitry associated with the single pressure sensor is therefore able to provide numerous indications to system operators regarding system performance. The use of a single sensor obviates the need for complex monitoring systems that can add to maintenance requirements, are prone to failure, and may add significant weight to a machine. Further, by monitoring the frequency and amplitude of the flow ripple, it is possible to differentiate between flow restrictions and pump failure.

For the case of a positive displacement pump driven by an electric induction motor the speed of the pump and motor is less than the frequency of the motor electric excitation by what is typically referred to as the motor slip speed. A typical slip speed curve for an induction motor is provided at FIG. 7. The slip speed is a function of the load torque on the motor such that increasing the slip speed the torque capability increases until peak torque is reached at typically about 10% slip speed. If the slip speed is increased further the motor torque capability declines. By using the pump ripple to determine the pump speed and subtracting this from motor excitation frequency the slip speed can be determined which will allow motor load torque and also motor power to be determined. The motor power output can also be determined from the pump output power which is proportional to pump flow times pump pressure rise. This allows an independent verification of pump flow and pressure against induction motor loading to check induction motor health or errors in the pressure measurement. By assessing the amount of motor slip speed by comparing the output pump frequency with the pump motor excitation frequency, it is also possible to determine the operating point of the induction motor relative to its maximum design output power. By measuring the motor operating point relative to the optimum design point it is possible to make appropriate corrections to better optimize the pump and motor performance, for example by reducing the motor speed or increasing the flow circuit effective restriction area. This technique can be similarly used in other pumps driven by motors that droop in speed with increased torque load like a fluid coupled motor or a pump driven through a friction clutch.

Although the present disclosure discussed incompressible fluid systems as a hydraulic system, such as an oil or fuel system in a turbine engine, the present disclosure is not so limited. Rather, the present disclosure may be applied to additional incompressible fluid systems including, but not limited to, fuel systems, liquid cooling systems, hydraulic systems, and the like. The present disclosure may be applied to closed or open systems.

Although examples are illustrated and described herein, embodiments are nevertheless not limited to the details shown, since various modifications and structural changes may be made therein by those of ordinary skill within the scope and range of equivalents of the claims.

What is claimed is:

1. A method of monitoring performance of an incompressible fluid system, the incompressible fluid system having a positive displacement pump and a pressure sensor, the method comprising:
   sensing a pressure of the fluid with the pressure sensor;
   determining from the pressure sensing a ripple frequency of the fluid and a speed of the positive displacement pump;
   calculating from the speed of the positive displacement pump a flow rate of the fluid induced by the positive displacement pump;
   determining, based on the calculated flow rate and the sensed pressure, a flow restriction of the fluid system; and
   assessing the fluid system for an excessive flow restriction condition using the determined flow restriction.

2. The method of claim 1 wherein the step of assessing the fluid system for an excessive flow restriction condition using the determined flow restriction comprises:
   calculating an average fluid pressure over a period of time based on the sensed fluid pressures;
   comparing the calculated average fluid pressure to a fluid pressure sensed at a specific time; and
   indicating an excessive flow restriction when the fluid pressure sensed at a specific time deviates from the calculated average fluid pressure by greater than a threshold magnitude.

3. The method of claim 1 wherein the pressure sensor is disposed at a discharge of the positive displacement pump.

4. The method of claim 1 wherein the step of assessing the fluid system for an excessive flow restriction condition using the determined flow restriction comprises:
   comparing the determined flow restriction of the fluid system to a baseline flow restriction; and
   indicating an excessive flow restriction when the determined flow restriction exceeds the baseline flow restriction by a first predetermined amount.

5. The method of claim 4 further comprising:
   providing an indication to an operator of the fluid system to inspect a filter of the fluid system when the determined flow restriction exceeds the baseline flow restriction by a second predetermined amount.

6. The method of claim 1 further comprising:
   developing a pressure trendline from the sensed pressures collected in the step of sensing a pressure of the fluid with the pressure sensor; and
   evaluating the pressure trendline to determine a degree of flow restriction in the fluid system.

7. The method of claim 6 further comprising:
   evaluating the pressure trendline to determine whether the positive displacement pump has failed.

8. The method of claim 1 wherein said positive displacement pump is coupled to a rotatable prime mover, the method further comprising:
   determining, from the speed of the positive displacement pump, the speed of the rotatable prime mover.

9. The method of claim 8 further comprising comparing the speed of the rotatable prime mover to an output of another sensor that measures the speed of the rotatable prime mover.

10. A method of monitoring a performance of an incompressible fluid system using a single sensor disposed in the fluid system, the fluid system comprising a positive displacement pump coupled to fluid conduit and driven by a prime mover, the single sensor comprising a pressure sensor for sensing the pressure of a fluid passing through the fluid conduit, the method comprising:
    sensing a pressure of the fluid with the pressure sensor for a period of time;
    determining from the pressure sensing a ripple frequency of the fluid and a speed of the positive displacement pump;
    checking, using the ripple frequency of the fluid, for failure of a pump driver coupling the positive displacement pump to the prime mover;
    deriving the speed of the prime mover from the speed of the positive displacement pump and comparing the derived speed to a measured speed of the prime mover; and
    evaluating the fluid system for an excessive flow restriction condition by:
       calculating from the speed of the positive displacement pump a flow rate of the fluid induced by the positive displacement pump;
       determining, based on the calculated flow rate and the sensed pressure, a flow restriction of the fluid system;
       comparing the determined flow restriction of the fluid system to a baseline flow restriction; and
       indicating an excessive flow restriction when the determined flow restriction exceeds the baseline flow restriction by a first predetermined amount.

11. The method of claim 10 wherein the baseline flow restriction is a calculated average flow restriction over a period of time.

12. The method of claim 10 further comprising:
    providing an indication to an operator of the fluid system to inspect a filter of the fluid system when the determined flow restriction exceeds the baseline flow restriction by a second predetermined amount.

13. The method of claim 10 further comprising:
    developing a pressure trendline from the sensed fluid pressures collected in the step of sensing a pressure of the fluid system with the pressure sensor; and
    evaluating the pressure trendline to determine a degree of flow restriction in the fluid system.

14. The method of claim 10 further comprising:
    developing a pressure trendline from the sensed fluid pressures collected in the step of sensing a pressure of the fluid system with the pressure sensor; and
    evaluating the pressure trendline to determine leakage of the positive displacement pump.

15. The method of claim 10 further comprising:
    creating first logged data comprising sensed pressure, ripple frequency, speed of the positive displacement pump, and flow rate determined for a first time;
    creating second logged data comprising sensed pressure, ripple frequency, speed of the positive displacement pump, and flow rate determined for a second time;
    comparing said second logged data to said first logged data to determine leakage of the positive displacement pump.

16. The method of claim 10 further comprising:
    evaluating the fluid system for resonances based on pressure ripple.

17. A method of monitoring deterioration of a positive displacement pump, the positive displacement pump included in an incompressible fluid system, the incompressible fluid system further comprising a pressure sensor positioned to sense a pressure of fluid exiting the positive displacement pump, the method comprising:

sensing a pressure of the fluid with the pressure sensor at a first time;
determining from the sensed pressure a ripple frequency of the fluid and speed of the positive displacement pump at the first time;
calculating from the speed of the positive displacement pump a flow rate of the fluid at the first time;
creating first logged data by saving to a memory the sensed pressure, ripple frequency, speed of the positive displacement pump, and flow rate determined at the first time;
repeating the steps of sensing pressure, determining ripple frequency and speed of the positive displacement pump, and calculating flow rate for a second time; and
creating second logged data by saving to a memory the sensed pressure, ripple frequency, speed of the positive displacement pump, and flow rate determined at the second time.

18. The method of claim 17 further comprising:
comparing the second logged data to the first logged data to determine leakage of the positive displacement pump; and
providing an indication to an operator of the fluid system when the determined leakage of the positive displacement pump exceeds a predetermined amount.

19. The method of claim 17 further comprising:
developing a pressure trendline from the sensed pressures of the first and second logged data; and
evaluating the pressure trendline to determine a degree of flow restriction in the fluid system.

20. The method of claim 19 further comprising:
evaluating the pressure trendline to determine whether the positive displacement pump has failed.

* * * * *